(12) United States Patent
Nakamura

(10) Patent No.: US 10,793,085 B2
(45) Date of Patent: Oct. 6, 2020

(54) IMAGING DEVICE

(71) Applicant: Nidec Copal Corporation, Tokyo (JP)

(72) Inventor: Yuta Nakamura, Tokyo (JP)

(73) Assignee: Nidec Copal Corporation, Tokyo (JP)

( * ) Notice: Subject to any disclaimer, the term of this patent is extended or adjusted under 35 U.S.C. 154(b) by 0 days.

(21) Appl. No.: 16/098,534

(22) PCT Filed: Apr. 26, 2017

(86) PCT No.: PCT/JP2017/016644
§ 371 (c)(1),
(2) Date: Nov. 2, 2018

(87) PCT Pub. No.: WO2017/191797
PCT Pub. Date: Nov. 9, 2017

(65) Prior Publication Data
US 2019/0135195 A1 May 9, 2019

(30) Foreign Application Priority Data

May 6, 2016 (JP) .................................. 2016-093510

(51) Int. Cl.
*B60R 11/04* (2006.01)
*H04N 5/225* (2006.01)
(Continued)

(52) U.S. Cl.
CPC ............... *B60R 11/04* (2013.01); *G02B 7/02* (2013.01); *G03B 15/00* (2013.01); *G03B 17/02* (2013.01);
(Continued)

(58) Field of Classification Search
None
See application file for complete search history.

(56) References Cited

U.S. PATENT DOCUMENTS

2007/0141881 A1* 6/2007 Lee ...................... G02B 7/026
439/179
2012/0140111 A1 6/2012 Hayashide et al.
(Continued)

FOREIGN PATENT DOCUMENTS

EP 1 244 288 A2 9/2002
EP 1244288 A2 * 9/2002 ............... H04N 1/03
(Continued)

OTHER PUBLICATIONS

International Search Report dated Jul. 18, 2017 during the prosecution of International Patent Application No. PCT/JP2017/016644.
(Continued)

*Primary Examiner* — Edemio Navas, Jr.
(74) *Attorney, Agent, or Firm* — Troutman Pepper Hamilton Sanders LLP

(57) ABSTRACT

An imaging device includes a lens barrel for supporting, while enclosing, one or more lenses; an imaging element for detecting light that passes through the lens; a lens holder for supporting the lens barrel; an elastic body that is disposed so as to bias the lens barrel relative to the lens holder; and an upper case that is formed so as to enable connection with an external member. The lens holder and the upper case are formed integrally. In such an imaging device, the lens holder and the upper case are formed integrally, and thus when compared to a configuration wherein the lens holder and the upper case are structured separately, the number of components can be reduced, thereby enabling a reduction in costs.

7 Claims, 11 Drawing Sheets

(51) Int. Cl.
    *G02B 7/02*         (2006.01)
    *G03B 15/00*      (2006.01)
    *G03B 17/02*      (2006.01)

(52) U.S. Cl.
    CPC ........... *H04N 5/225* (2013.01); *H04N 5/2252* (2013.01); *H04N 5/2254* (2013.01); *H04N 5/2257* (2013.01)

(56) References Cited

U.S. PATENT DOCUMENTS

| | | |
|---|---|---|
| 2013/0107381 A1 | 5/2013 | Ezawa et al. |
| 2014/0016919 A1* | 1/2014 | Okuda ................. G03B 17/565 396/25 |
| 2014/0160284 A1* | 6/2014 | Achenbach .......... H04N 5/2251 348/143 |

FOREIGN PATENT DOCUMENTS

| | | |
|---|---|---|
| JP | 2006-162803 A | 6/2006 |
| JP | 2016-39428 A | 3/2016 |
| WO | 2016017682 A1 | 2/2016 |

OTHER PUBLICATIONS

Extended European Search Report issued in corresponding European Patent Application No. 17 79 2730 dated Nov. 20, 2019.

* cited by examiner

IMAGING DEVICE

CROSS-REFERENCE TO RELATED APPLICATIONS

This is a U.S. national phase application under 35 U.S.C. § 371 of International Patent Application No. PCT/JP2017/016644, filed Apr. 26, 2017, and claims benefit of priority to Japanese Patent Application No. 2016-093510, filed May 6, 2016. The entire contents of these applications are hereby incorporated by reference.

FIELD OF TECHNOLOGY

One form of the present invention relates to an imaging device able to perform position adjustment and position securing with good accuracy.

As imaging devices used for vehicle-mounted cameras or monitoring cameras, there are those that comprises a lens barrel for arranging and holding a plurality of lenses, a lens holder for supporting the lens barrel, a printed circuit board (sensor substrate) whereon an imaging element is mounted, an upper case (housing) that supports the lens holder and that is connected to a vehicle body, or the like, and so forth. Such a conventional imaging device is disclosed in, for example, US Patent Application Publication 2014/0160284, Specification Disclosure of the Invention.

BACKGROUND

In a conventional imaging device, such as described above, from the perspective of ease of assembly, the lens holder and the upper case are formed as separate members. However, in, for example, vehicle-mounted cameras, and the like, of recent years, in products wherein it is necessary to secure the optical axial position with high accuracy, there has been a problem with variability in positioning between the lens holder and the upper case.

SUMMARY

The present invention adopts means such as the following in order to solve the problem described above. Note that while in the explanation below, reference symbols from the drawings are written parentheses for ease in understanding the present invention, the individual structural elements of the present invention are not limited to those that are written, but rather should be interpreted broadly, in a range that could be understood technically by a person skilled in the art.

One means according to the present invention of an imaging device, including a lens barrel supporting, while enclosing, one or more lenses; an imaging element for detecting light that passes through the lens; a lens holder for supporting the lens barrel; an elastic body that is disposed so as to bias the lens barrel relative to the lens holder; and an upper case that is formed so as to enable connection with an external member, wherein the lens holder and the upper case are formed integrally.

In the imaging device according to the structure set forth above, the lens holder and the upper case are formed integrally, and thus when compared to a configuration wherein the lens holder and the upper case are structured separately, the number of components can be reduced, thereby enabling a reduction in costs. Moreover, the reduction in the number of components reduces the tolerance error variability for the component as a whole, enabling, for example, an increase the accuracy of the optical axial position. Moreover, because the structure is one wherein the elastic body is disposed so as to bias the lens barrel, it is possible to support the lens barrel with stability in the lens holder. This enables suppression of the occurrence of misalignment of the optical axis.

In the imaging device set forth above, preferably the lens barrel is formed so as to contact the lens holder and contact the elastic body.

Given the imaging device set forth above, the lens barrel is supported and secured by the lens holder and the elastic body, thus enabling a structure wherein the lens barrel can be supported with greater stability. Given this, this enables suppression of the occurrence of misalignment of the optical axis in the imaging element after assembly.

Preferably, the lens barrel is formed so as to contact the lens holder at at least 2 points (and, more preferably, at 2 points), and so as to contact the elastic body at at least 1 point (and, more preferably, at 1 point). This structure enables the lens barrel to be supported and secured with greater stability.

In the imaging device set forth above, preferably a recessed portion for position adjustment is formed in the lens barrel and the recessed portion is visible. The structure that enables visibility is a structure wherein a hole is formed in the elastic body, such as shown in the embodiments, described below, for example, and is structured such that the recessed portion is visible from the hole in the elastic body.

The imaging device set forth above enables a structure wherein a tool can be inserted into a recessed portion of the lens barrel from, for example, the hole of the elastic body after assembly of the imaging element. Through this, in the camera for vehicle mounting according the present embodiment, it is possible to perform focusing adjustment of the optical axis using the tool even after assembly of the various structures.

In the imaging device set forth above, preferably the elastic body has an elongated hole.

The imaging device set forth above enables the elastic force that is applied to the elastic body to be adjusted through changing the size of the elongated hole that is formed in the elastic body.

In the imaging device set forth above, preferably a groove-shaped recessed portion is formed, in the outer peripheral portion of the lens barrel, in a position that faces the elongated hole of the elastic body.

In the imaging device set forth above, preferably the elastic body comprises, integrally, and aperture plate for, for example, adjusting the amount of transmitted light, in using the imaging device (in imaging, or the like).

With the imaging device of this structure, the elastic body and the aperture plate are formed integrally, and thus, when compared to a structure wherein the elastic body and the aperture plate are separate units, this can reduce the number of components and reduce the amount of assembly work, thereby enabling a reduction in costs, and the like.

Preferably the imaging device set forth above is mounted in a moving body.

The imaging device set forth above enables proper adjustment of the optical axis, even in an imaging device for a moving body (for example, for vehicle mounting), that requires particularly high accuracy adjustment of the optical axis.

BRIEF DESCRIPTIONS OF THE DRAWINGS

DETAILED DESCRIPTION OF THE DRAWINGS

Embodiments according to the present invention will be explained in detail below, referencing the drawings, following the structures below. However, the embodiment explained below is no more than an example of the present invention, and must not be interpreted as limiting the technical scope of the present invention. Note that in the various drawings, identical reference symbols are assigned to identical structural elements, and explanations thereof may be omitted.

Example 1

The camera for vehicle mounting according to the present embodiment is an imaging device that is structured equipped with an upper case for vehicle mounting, and a distinctive feature is the point that the upper case and the lens holder are formed integrally. Moreover, another distinctive feature is the point that the lens barrel is biased by a lens spring in relation to the lens holder, and that the lens barrel is secured thereby. The structure of the camera for vehicle mounting according to the present embodiment will be explained in detail below.

Figure 1:
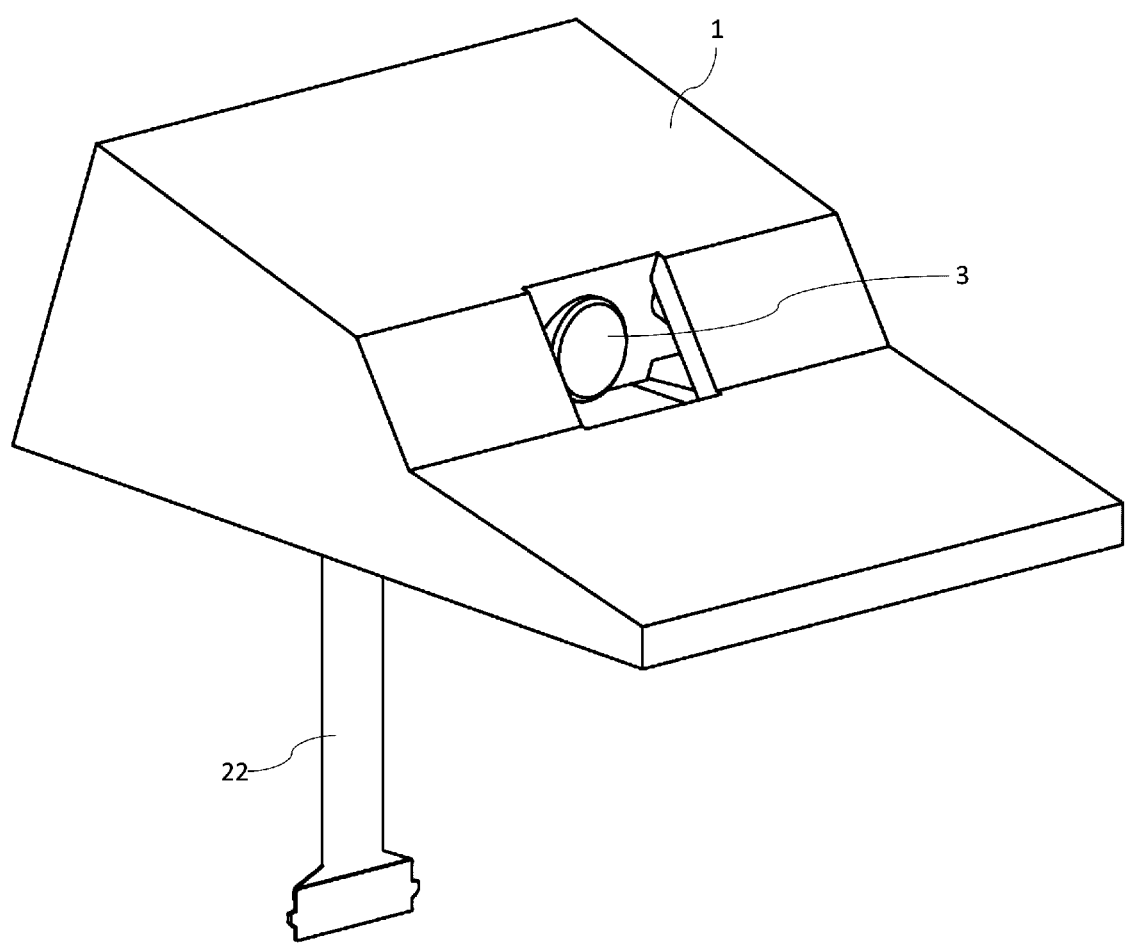
FIG. 1 is an external view of a camera for vehicle mounting according to an example.

FIG. 1 is an external perspective diagram when a camera for vehicle mounting, according the present embodiment, is viewed from the front face side.

Figure 2:
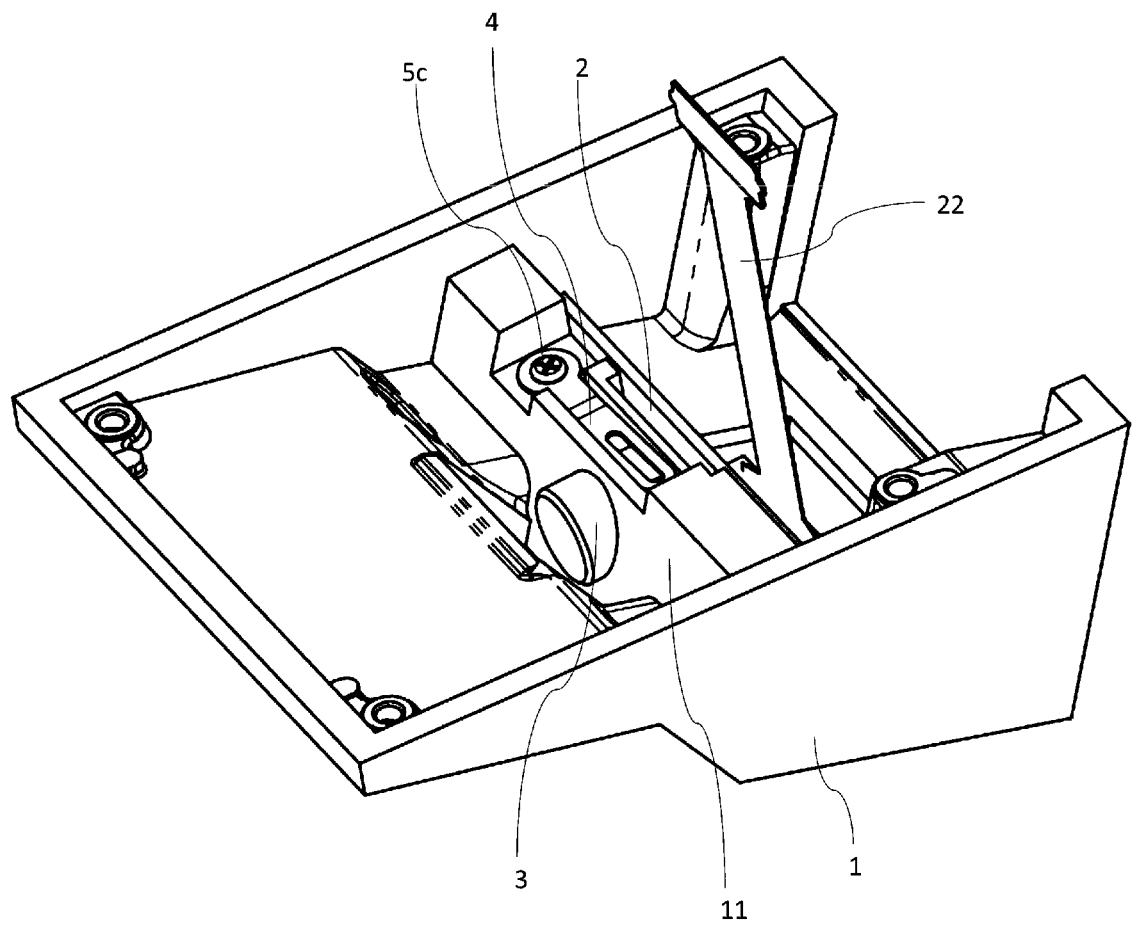
FIG. 2 is a diagram wherein the camera for vehicle mounting, according to the example, is viewed from below.
Figure 3:
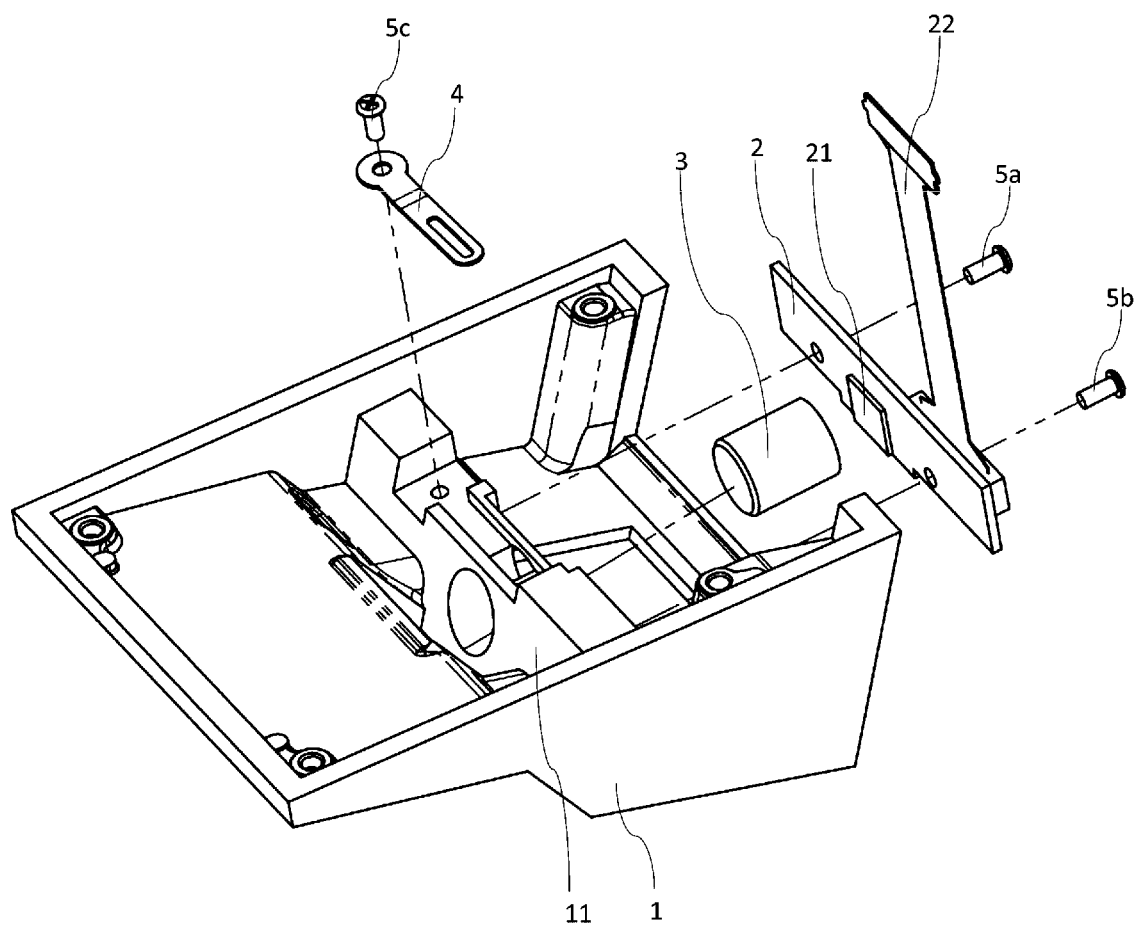
FIG. 3 is an exploded view of a camera for vehicle mounting according to the example.
Figure 4:
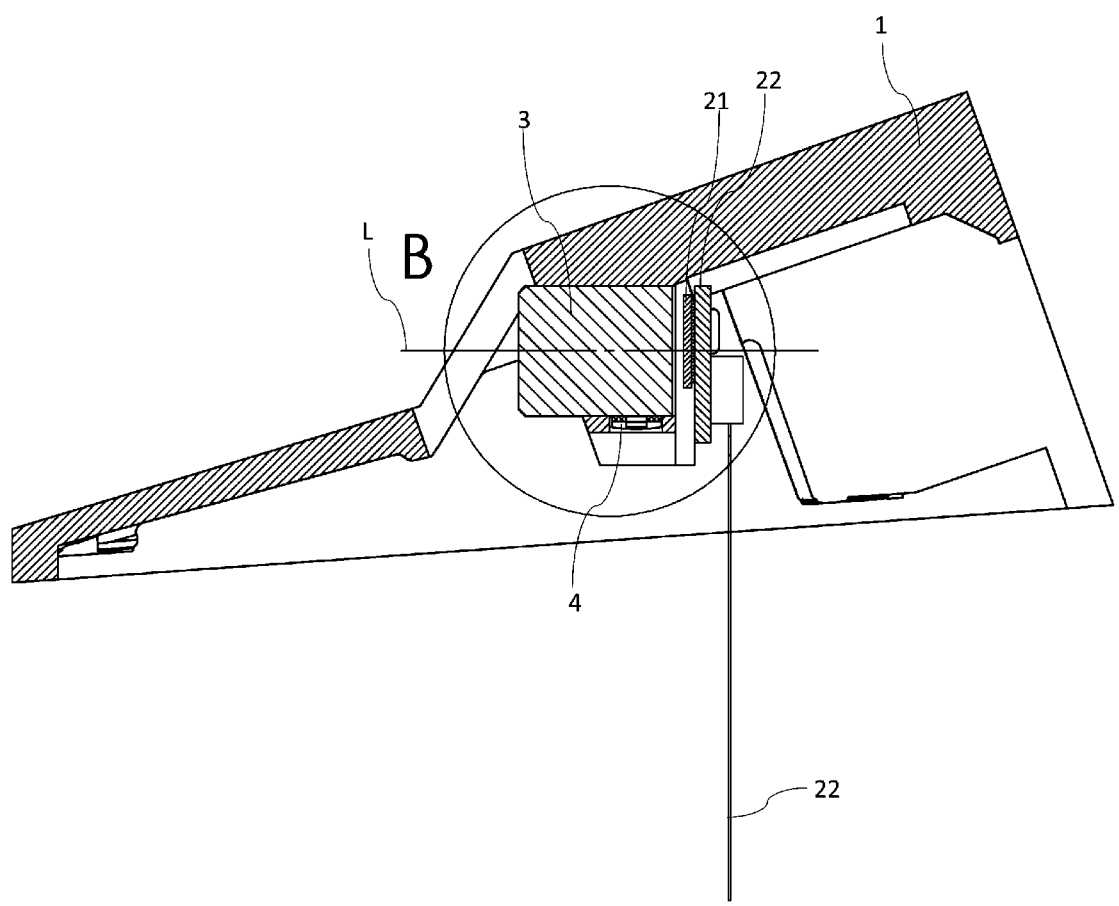
FIG. 4 is a cross-sectional diagram of a camera for vehicle mounting according to the example.
Figure 5:
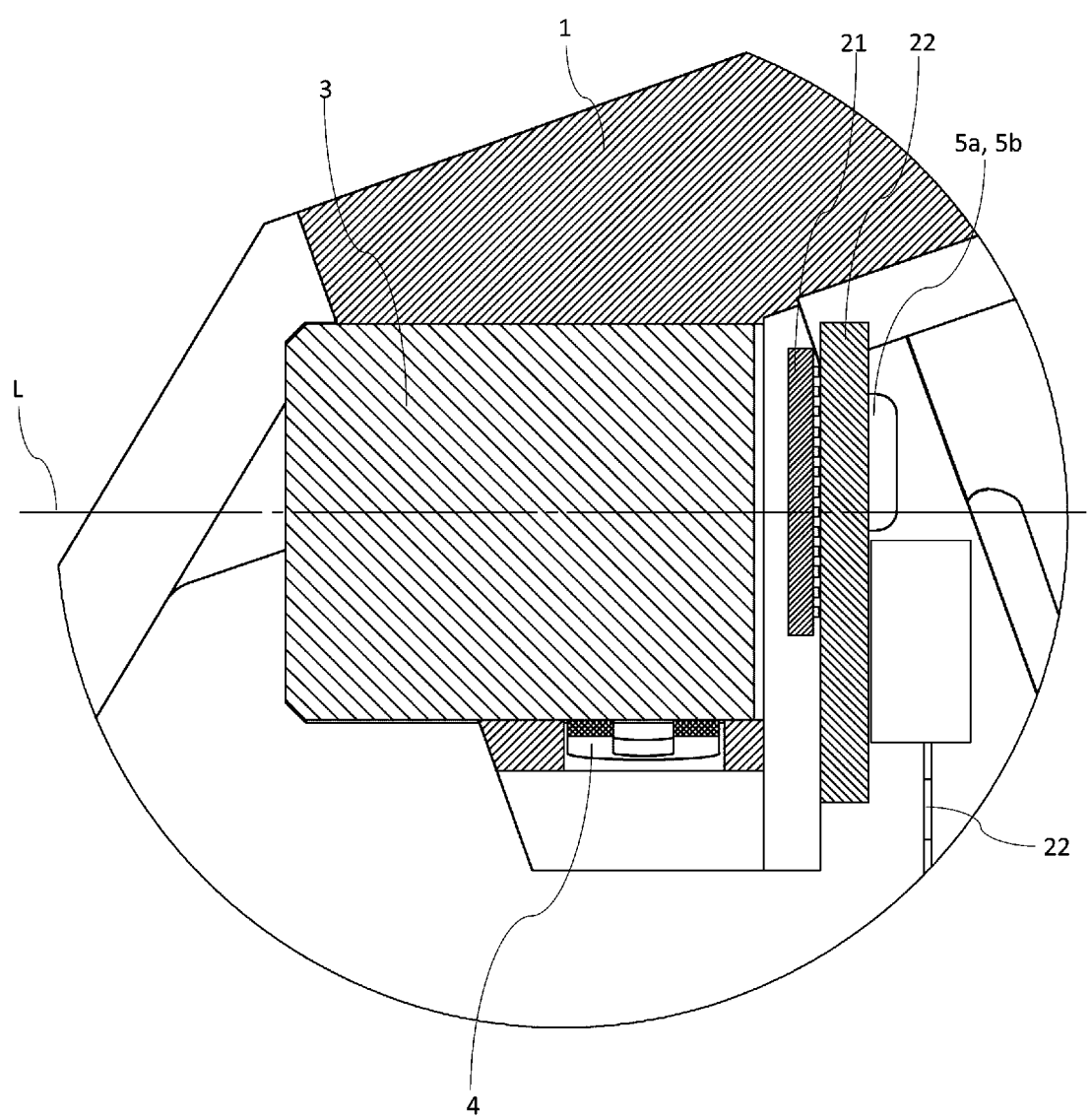
FIG. 5 is an enlarged cross-sectional diagram of a camera for vehicle mounting according to the example.

FIG. 2 is a perspective diagram wherein the vehicle-mounted camera according the present embodiment is viewed from the bottom side. FIG. 3 is an exploded perspective diagram wherein the vehicle-mounted camera according the present embodiment is viewed from the bottom side. FIG. 4 is a cross-sectional view of the lengthwise direction (the optical axial direction) of the vehicle-mounted camera in the form of the present embodiment. FIG. 5 is an enlarged view of the B position in FIG. 4. In FIG. 4 and FIG. 5, L indicates the optical axis.

As shown in FIG. 1 through FIG. 5 (and, in particular, in FIG. 2 and FIG. 3), the camera for vehicle mounting according to the present embodiment is structured including an upper case 1 of a form that is integrated with the lens holder, a sensor substrate 2, a lens barrel 3, and a leaf spring 4. The upper case 1 is formed integrally with the lens holder 11. In the assembled state, as shown in FIG. 1, in particular, the state is one wherein the lens barrel 3 can be seen from the imaging subject side, from the opening portion that is formed in the upper case 1, a state wherein the sensor substrate 2, and the like, that are disposed within the upper case 1, cannot be seen.

<Upper Case 1>

The upper case 1 is a case for covering the lens barrel 3 and the sensor substrate 2 of the camera for vehicle mounting according to the present embodiment, and is formed from a resin or a metal. In the conventional structure, the lens holder 11 for supporting the lens barrel 3 and the upper case 1 are structured separately; however the lens holder 11 according to the present embodiment is formed integrally with the upper case 1. An opening portion is formed in the upper case 1, structured so that light from the imaging subject will be incident, from the opening portion, into the lens barrel 3 that is supported by the lens holder 11. A cylindrical opening portion that is essentially parallel to the optical axis is formed in the lens holder 11, and assembled so that the lens barrel 3 is supported by the opening portion part. The lens barrel 3 is supported and secured in the lens holder 11 through a bolt fitting or screw.

<Sensor Substrate 2>

The sensor substrate 2 is a rigid substrate formed from resin, or the like, and a sensor 21, which functions as an imaging element, and other electronic component are mounted thereon. A connector that is connected to a flexible substrate 22 that has flexibility is further attached to the sensor substrate 2, and the sensor substrate 2 and the flexible substrate 22 are connected electrically through this connector. The flexible substrate 22 is used in order to connect the sensor substrate 2 and an external device electrically. The sensor 21 is a photoelectric converting element such as, for example, a CCD or a CMOS, or the like, and receives incident light from the imaging subject through the lens, to capture an image of the state of the imaging subject. Note that other structures, such as a cover lens, or the like, can be combined with the sensor 21, but such structures are also included in the "sensor 21" according to the present invention. Moreover, a shutter may be disposed between the sensor 21 and the lens of the lens barrel 3. The image data captured by the sensor 21 is outputted through the flexible substrate 22 to an external device. The sensor substrate 2 is attached to a lens holder 11 of the upper case 1 through screws 5a and 5b. Some degree of gap (clearance) is formed in the screw openings for the screws 5a and 5b that are formed in the sensor substrate 2, thereby enabling a positional adjustment to the sensor 21, which is mounted on the sensor substrate 2, in the plane that is perpendicular to the optical axis.

<Lens Barrel 3>

The lens barrel 3 is formed in a circular column shape so as to support and enclose one or more lenses. The various lenses of the lens barrel 3, in the assembled state, refract, and direct to the sensor 21, the light that is incident from the imaging subject through the opening portion of the upper case 1.

The lens barrel 3 is supported by the lens holder 11 while being biased toward the lens holder 11 by a leaf spring 4. More specifically, in the lens barrel 3, in a state wherein it is supported in the lens holder 11, a portion of the bottom side is exposed (referencing FIG. 3 through FIG. 5), where the center part of the leaf spring 4 contacts this exposed part. The leaf spring 4, through the above, biases the lens barrel 3 toward the top (the direction towards the lens holder 11), so that the lens barrel 3 is supported stably by the lens holder 11 through the biasing by the leaf spring 4. As shown in FIG. 3, the leaf spring 4 is attached to the lens holder 11 through a screw 5c.

In this way, in the camera for vehicle mounting according to the present embodiment, the lens holder 11 and the upper case 1 are formed integrally, thus enabling a reduction in the number of components when compared to a structure wherein the lens holder 11 and the upper case 1 are structured separately, thereby enabling a reduction in costs. Moreover, the reduction in the number of components reduces the tolerance error variability for the component as a whole, enabling, for example, an increase the accuracy of the optical axial position.

Moreover, in the camera for vehicle mounting according to the present embodiment, the structure is one wherein the leaf spring 4 is disposed to bias the lens barrel 3, enabling the lens barrel 3 to be secured and supported with stability on the lens holder 11. This enables suppression of the occurrence of misalignment of the optical axis.

Example 2

The camera for vehicle mounting according to the present invention, when compared to the camera for vehicle mounting of the first embodiment, is dissimilar in the structure for supporting the lens barrel, but identical in the other structures. In the camera for vehicle mounting according to the present embodiment, one distinctive feature is the point that the structure supports the lens barrel with greater stability than the camera for vehicle mounting according to the first embodiment. The structure of the camera for vehicle mounting according to the present embodiment will be explained in detail below.

Figure 6:
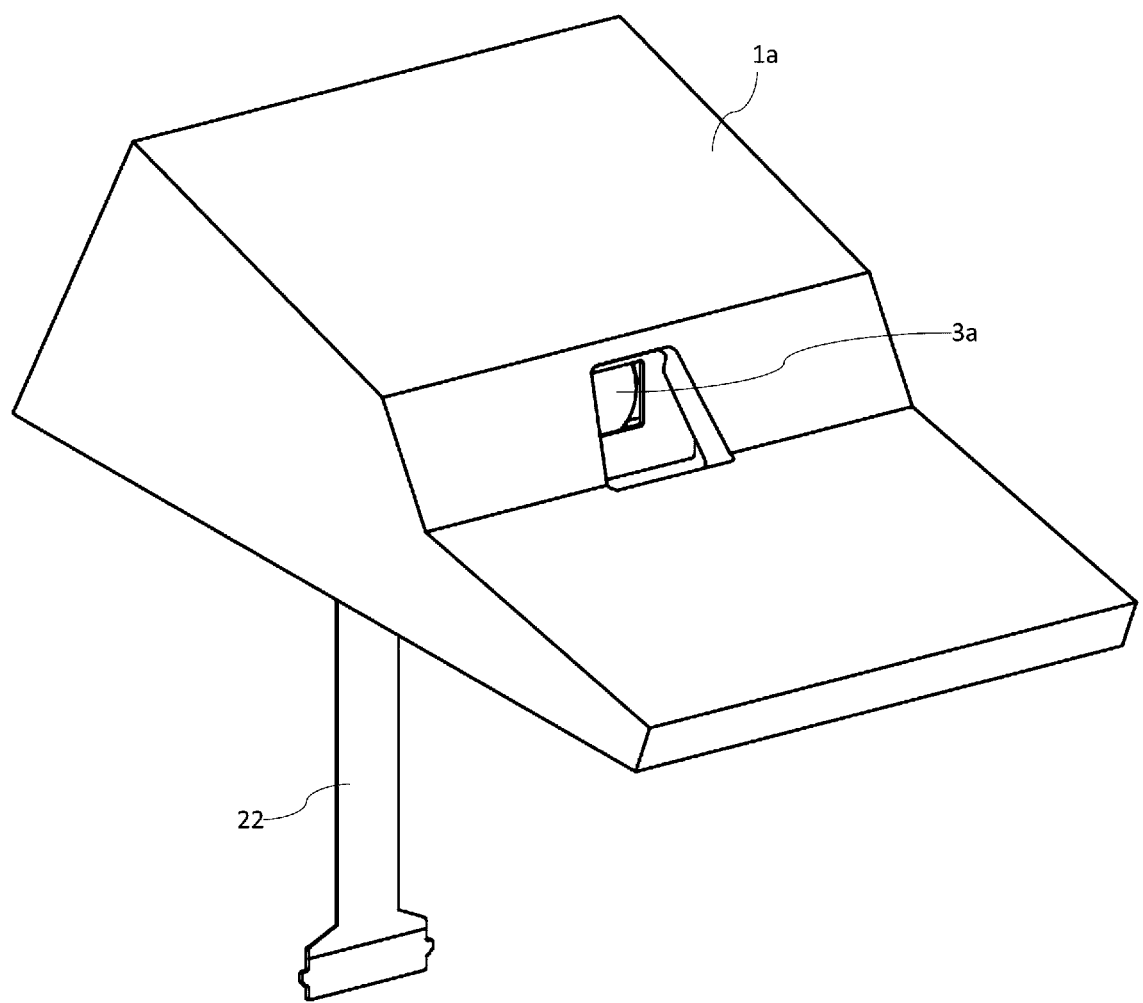
FIG. 6 is an external view of a camera for vehicle mounting according to another example.

FIG. 6 is an external perspective diagram when a camera for vehicle mounting, according the present embodiment, is viewed from the front face side.

Figure 7:
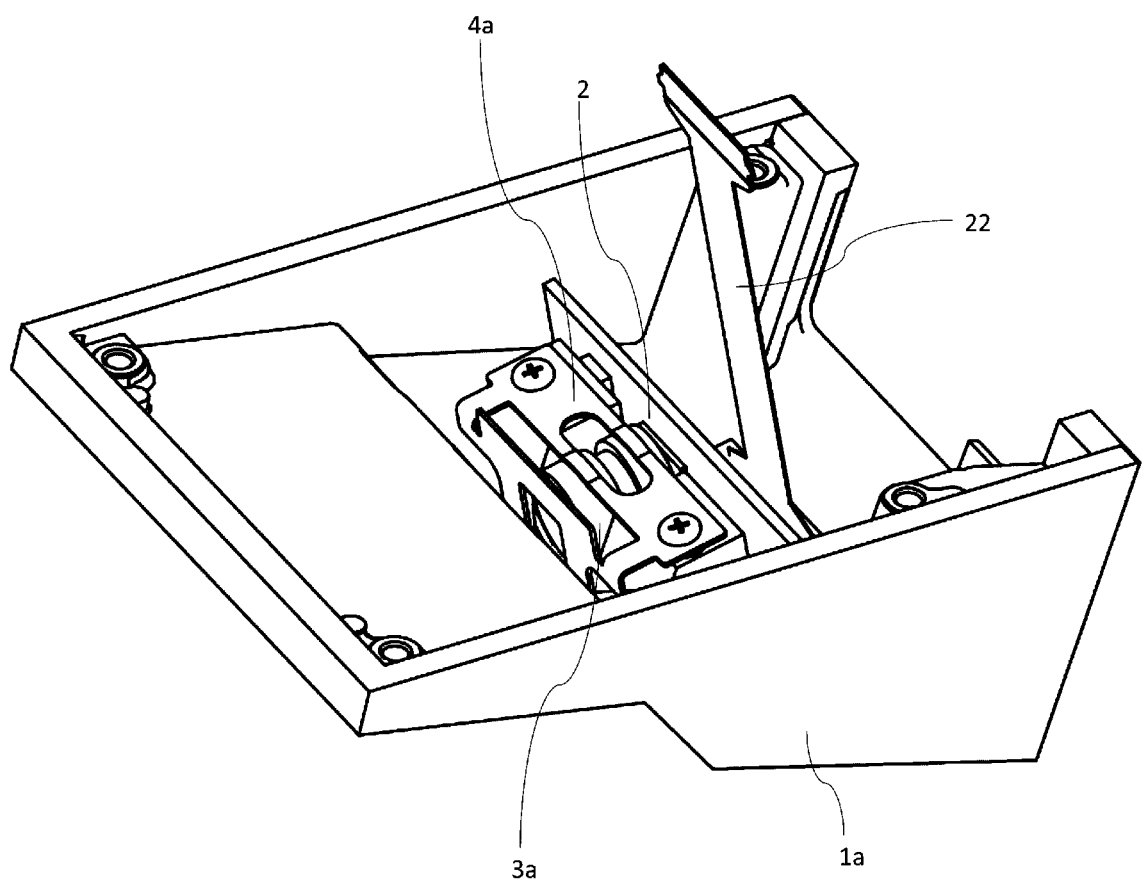
FIG. 7 is a diagram wherein the camera for vehicle mounting, according to the other example, is viewed from below.
Figure 8:
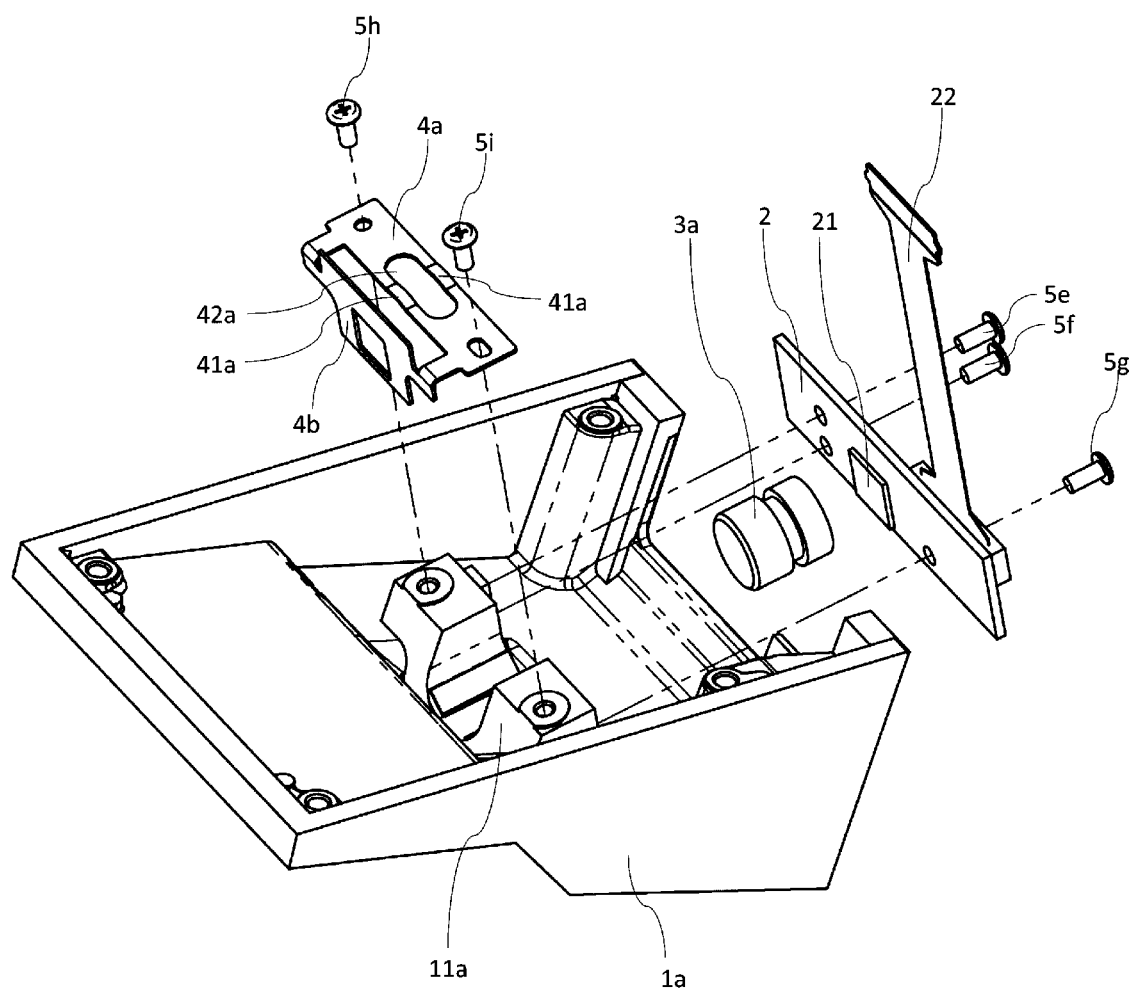
FIG. 8 is an exploded view of a camera for vehicle mounting according to the other example.
Figure 9:
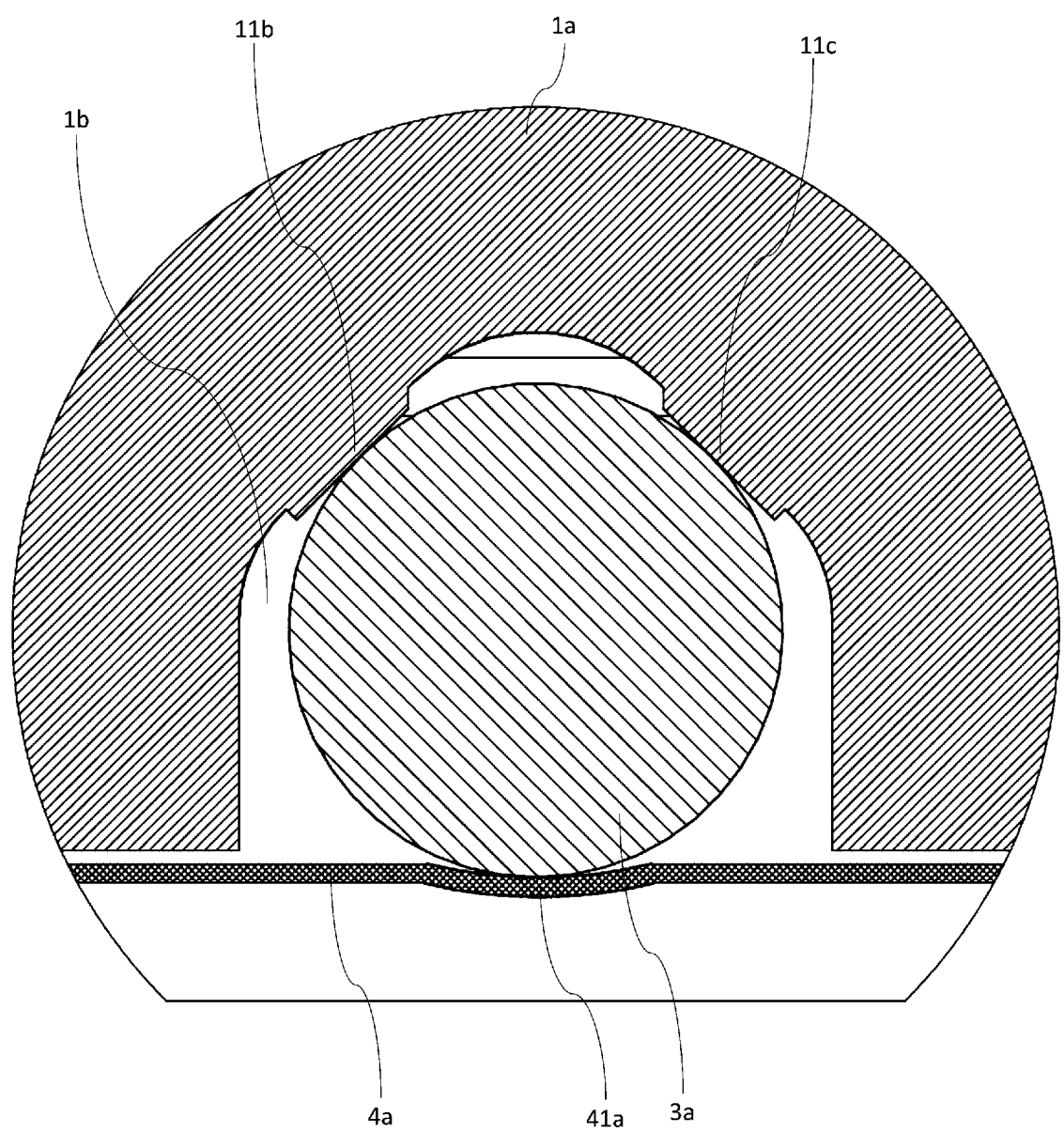
FIG. 9 is a cross-sectional diagram of a camera for vehicle mounting according to the other example.
Figure 10:
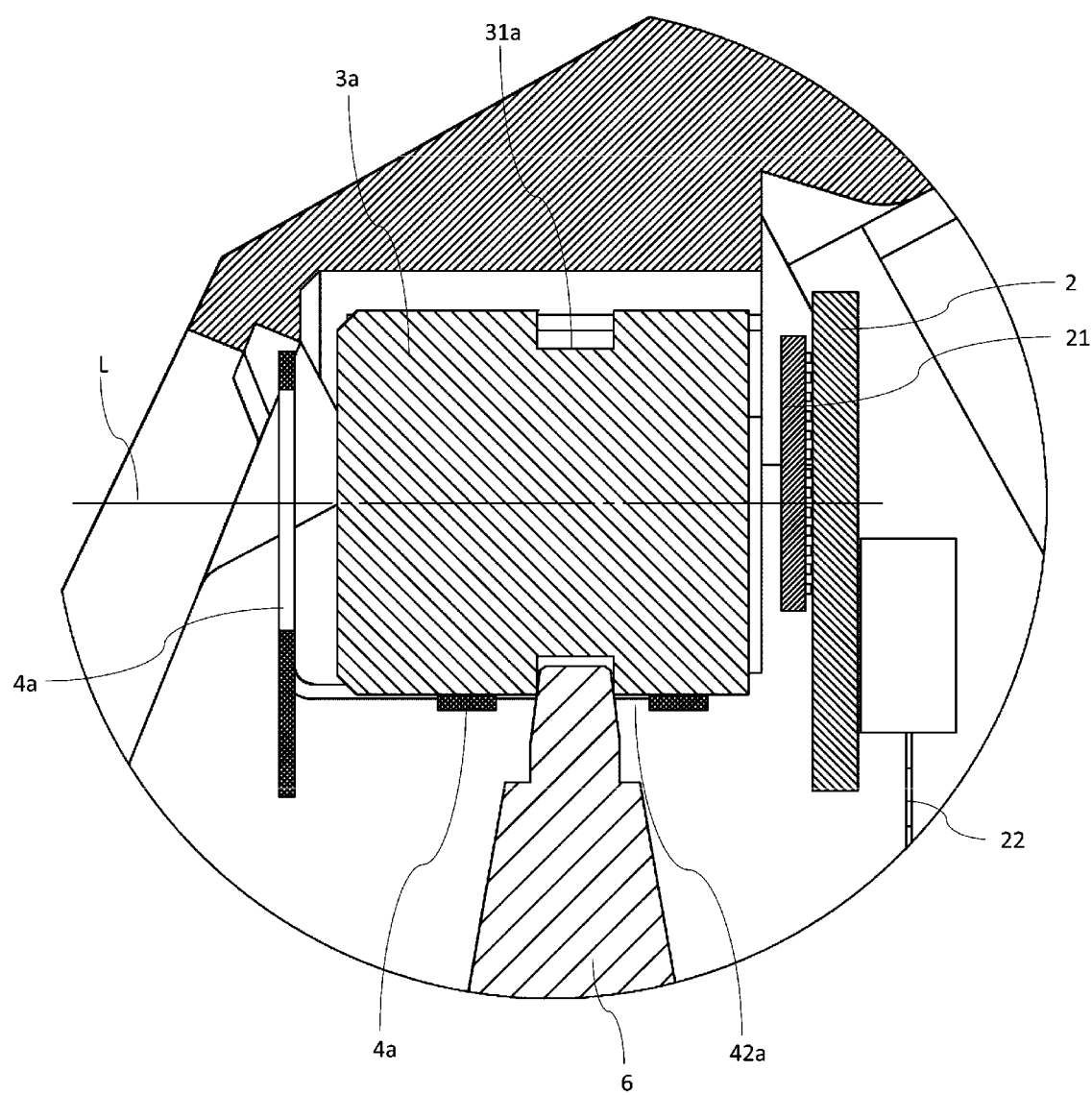
FIG. 10 is an enlarged cross-sectional diagram of a camera for vehicle mounting according to the other example.

FIG. 7 is a perspective diagram wherein the vehicle-mounted camera according the present embodiment is viewed from the bottom side. FIG. 8 is an exploded perspective diagram wherein the vehicle-mounted camera according the present embodiment is viewed from the bottom side. FIG. 9 is a cross-sectional diagram in the plane that is perpendicular to the optical axis of the vehicle-mounted camera according to the present embodiment. The cross-sectional diagram of FIG. 9 is an enlarged view at the position wherein the supporting part of the lens barrel 3 is seen easily. FIG. 10 is a cross-sectional view of the lengthwise direction (the optical axial direction) of the vehicle-mounted camera according to the present embodiment, and is a diagram corresponding to FIG. 5 (the enlarged view) of the first embodiment. In FIG. 10, L indicates the optical axis.

As shown in FIG. 5 through FIG. 10 (and, in particular, in FIG. 7 and FIG. 8), the camera for vehicle mounting according to the present embodiment is structured including an upper case 1a of a form that is integrated with the lens holder, a sensor substrate 2, a lens barrel 3a, and a leaf spring 4a. The upper case 1a is formed integrally with the lens holder 11a. In the assembled state, as shown in FIG. 1, in particular, the state is one wherein the lens barrel 3 can be seen from the imaging subject side, from the opening portion that is formed in the upper case 1a, a state wherein the sensor substrate 2, and the like, that are disposed within the upper case 1a, cannot be seen.

The upper case 1a has essentially the same structure as that of the upper case 1 of the first embodiment, but the structure of the lens holder 11a that is formed integrally is generally different. The lens holder 11a, as depicted in FIG. 9, in particular, is formed in a recessed and raised shape, through formation of raised portions 11b and 11c. The lens holder 11a has a shape wherein, when viewed in the cross-section (referencing FIG. 9), the raised portions 11b and 11c contact the lens barrel 3a at two points. Note that, as depicted in the cross-sectional view shown in FIG. 9, a space 1b that is formed by the upper case 1a and the leaf spring 4a is shaped in essentially an inverted V shape. The lens barrel 3a is disposed in this space 1b.

On the other hand, the leaf spring 4a is attached to the lens holder 11a through screws 5h and 5i (referencing FIG. 8), and, at the time of assembly, a portion thereof contacts the lens barrel 3a. A curved surface portion 41a is formed in the leaf spring 4a, and is shaped so that, when viewed in the cross-section (referencing FIG. 9), one point of the curved surface portion 41a is in contact with the lens barrel 3a. The leaf spring 4a, in the same manner as in the first embodiment, biases the lens barrel 3a upward (in the direction wherein the lens barrel 3a is pressed toward the lens holder 11a).

In this way, the lens barrel 3a is secured at three points: the raised portions 11b and 11c of the lens holder 11a, and the curved surface portion 41a of the leaf spring 4a. Through this, the lens barrel 3a is supported with greater stability in the lens holder 11a.

Moreover, an aperture plate 4b, for adjusting the amount of light that passes through at the time of imaging, is formed integrally with the leaf spring 4a in the present embodiment. When the elastic body 4a and the aperture plate 4b are formed integrally in this way, the number of components can be reduced and the amount of assembly work can be reduced, when compared to a structure wherein the elastic body 4a is structured separately from the aperture plate 4b, thereby enabling a reduction in cost.

Moreover, the lens barrel 3a is formed in a circular column shape, and, as depicted in FIG. 8 and FIG. 10, a recessed portion 31a is formed in the shape of a crosswise groove in the outer peripheral portion in the vicinity of the center portion thereof in the length direction. On the other hand, an elongated hole 42a is formed in the center part of the leaf spring 4a. In the state wherein the camera for vehicle mounting according to the present embodiment is assembled, the state is one wherein the recessed portion 31a of the lens barrel 3a can be seen from the elongated hole 42a of the leaf spring 4a. In the camera for vehicle mounting according to the present embodiment, after the variable structures have been assembled, the tip end portion 61 of an eccentric pin 6 is inserted from the elongated hole 42a of the leaf spring 4a into the recessed portion 31a of the lens barrel 3a, where the eccentric pin 6 can be rotated to carry out focusing adjustment of the optical axis.

Figure 11:
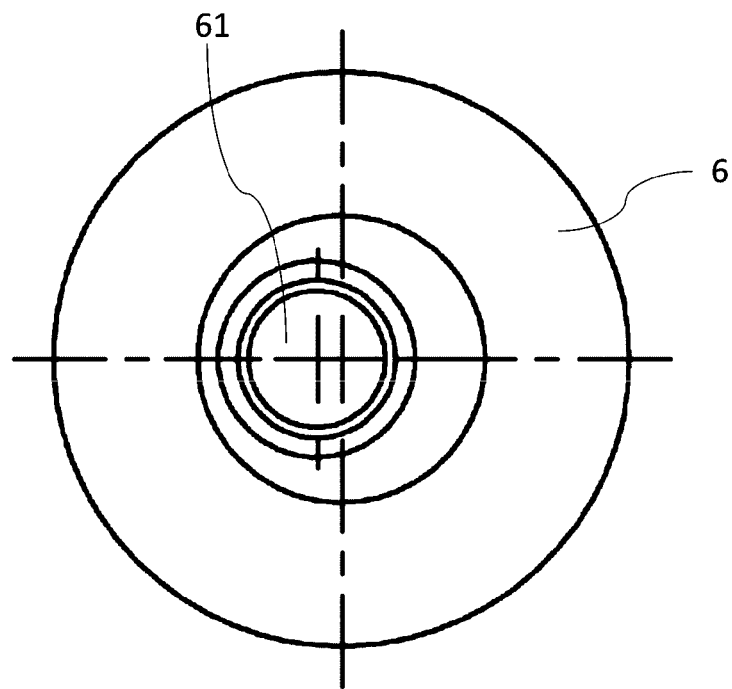
FIG. 11 is a diagram of an optical axis adjusting tool for a camera for vehicle mounting according to the other example.
Figure 11:
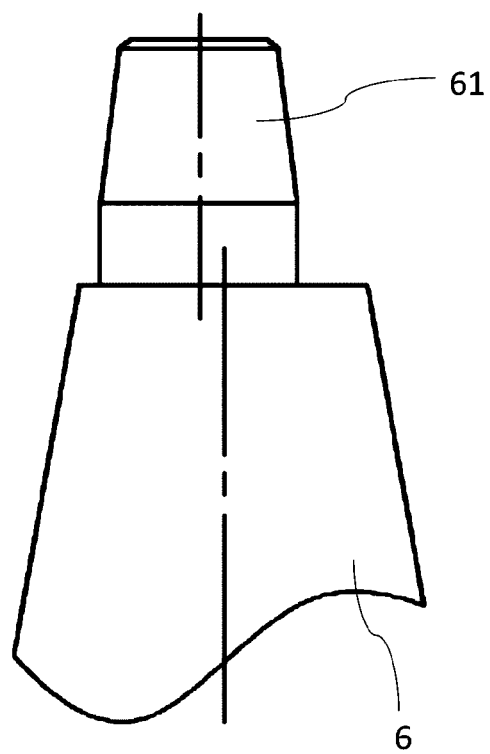

FIG. 11 is a diagram showing the structure of the eccentric pin 6, which is a tool for adjusting the optical axis, used in focusing adjustment of the lens barrel 3a. As depicted in FIG. 11, the tip end portion 61 that is formed with a diameter that is narrower than that of the shaft portion protrudes from the shaft portion of the eccentric pin 6, where the tip end portion 61 has a different center from that of the shaft portion. Because of this, the distance of the lens barrel 3a from the sensor 21 is changed through an operator, who carries out the assembly operation at the time of assembly, rotating the eccentric pin 6 wherein the tip end portion 61 has been inserted into the recessed portion 31a of the lens barrel 3a, and the focusing adjustment of the optical axis can be performed thereby.

As described above, in the camera for vehicle mounting according to the present embodiment, the structure is such that the tip end portion 61 of the eccentric pin 6 can be inserted into the recessed portion 31a of the lens barrel 3a from the elongated hole 42a of the leaf spring 4a after assembly. This enables the focusing adjustment of the optical axis to be carried out after assembly of the various structures in the camera for vehicle mounting according to the present embodiment. Note that the elastic force of the leaf spring 4a can be adjusted by changing the size of the elongated hole 42a in the leaf spring 4a.

<3. Supplementary Items>

An embodiment according to the present invention was explained in detail above. The explanation above is no more than an explanation of one form of embodiment, and the scope of the present invention is not limited to this form of embodiment, but rather is interpreted broadly, in a scope that can be understood by one skilled in the art.

For example, while, in the embodiments described above, the explanation was for a case wherein the upper case 1 and the lens holder 11a were formed integrally, these structures may be formed through an arbitrary manufacturing method, such as injection molding, or the like.

While the various embodiments set forth above each used a leaf spring to secure the lens barrel, this leaf spring may use another elastic body instead. However, a structure that uses a leaf spring made from metal is particularly preferred from the perspective of durability, or the like.

While in the various embodiments set forth above, the explanations were of structures wherein the sensor 21 was mounted on the sensor substrate 2 and image data is transferred to the outside through a flexible substrate 22, this structure is not a part that is a distinctive feature according to the present invention, so another structure may be substituted.

While in the embodiments set forth above the explanations used a camera for vehicle mounting as an example, these cameras for vehicle mounting may also be used as typical imaging devices that are not for vehicle mounting. However, the imaging element according to the present invention is used particularly effectively as an imaging device that is mounted onto a moving body, such as an automobile, which requires particularly high positional accuracy of the optical axis.

The present invention can be used effectively as, for example, an imaging device for vehicle mounting that requires particularly high precision position adjustments.

The invention claimed is:

1. An imaging device, comprising:
a lens barrel supporting, while enclosing, one or more lenses;
an imaging element detecting light that passes through the lens;
a lens holder supporting the lens barrel;
an elastic body that is disposed so as to bias the lens barrel relative to the lens holder; and
an upper case that is formed so as to enable connection with an external member, wherein:
the lens holder and the upper case are formed integrally,
the lens barrel is formed so as to contact the lens holder and contact the elastic body, and the lens holder is in contact with the lens barrel with a side surface of the lens barrel being urged by the elastic body,
the elastic body has a first surface having a curved surface portion and a second surface on which an aperture plate is formed, and
a bent portion that is bent with respect to the second surface is provided between the first surface and the second surface such that the first surface is orthogonal to an optical axis of the imaging element.

2. An imaging device as set forth in claim 1, wherein:
The lens barrel is formed so as to contact the lens holder at two points and to contact the elastic body at one point.

3. An imaging device as set forth in claim 1, wherein:
a recessed portion for position adjustment is formed in the lens barrel,
the elastic body has an opening, and
the recessed portion is visible through the opening.

4. An imaging device as set forth in claim 1, wherein:
the elastic body has an elongated hole.

5. An imaging device as set forth in claim 4, wherein:
a groove-shaped recessed portion is formed, in the outer peripheral portion of the lens barrel, in a position that faces the elongated hole of the elastic body.

6. An imaging device as set forth in claim 1, wherein the aperture plate is structured integrally with the elastic body.

7. An imaging device as set forth in claim 1 mounted on a moving body.

* * * * *